March 3, 1964 F. D. PFENING 3,123,406
APPARATUS FOR UNLOADING FINELY DIVIDED PARTICLES
Filed Dec. 16, 1960 4 Sheets-Sheet 1

INVENTOR.
FREDERIC D. PFENING
BY
*Schmieding and Fultz*
ATTORNEYS

March 3, 1964 F. D. PFENING 3,123,406
APPARATUS FOR UNLOADING FINELY DIVIDED PARTICLES
Filed Dec. 16, 1960 4 Sheets-Sheet 2

INVENTOR.
FREDERIC D. PFENING
BY
Schmieding and Fultz
ATTORNEYS

INVENTOR.
FREDERIC D. PFENING
BY
Schmieding and Fultz
ATTORNEYS

March 3, 1964 — F. D. PFENING — 3,123,406
APPARATUS FOR UNLOADING FINELY DIVIDED PARTICLES
Filed Dec. 16, 1960 — 4 Sheets-Sheet 4

INVENTOR.
FREDERIC D. PFENING
BY
Schmieding and Fultz
ATTORNEYS

United States Patent Office 3,123,406
Patented Mar. 3, 1964

3,123,406
APPARATUS FOR UNLOADING FINELY
DIVIDED PARTICLES
Frederic D. Pfening, Columbus, Ohio, assignor to The
Fred D. Pfening Co., Columbus, Ohio, a corporation
of Ohio
Filed Dec. 16, 1960, Ser. No. 76,295
4 Claims. (Cl. 302—27)

This invention relates to apparatus for unloading finely divided particles from a plurality of storage bin outlets.

In general the present invention comprises a frame means for disposition beneath multiple outlet storage bins or railroad cars used for storing or transporting finely divided particles such as flour or the like.

The frame means supports a plurality of pneumatic conveyors and associated apparatus which are adapted to rapidly unload multiple outlet bins in a novel manner.

In apparatuses of this type is has been the practice in the art to introduce a flow of air into one pneumatic conveyor wherein flour is added to the flow. The combined flow of air and flour is next introduced into a second pneumatic conveyor wherein more flour is added to the flow. In instances where flour is being added at only one of the two pneumatic conveyors, for example when one of the storage bins has been emptied, the air flow is still passed through both conveyors with a resulting loss in efficiency due to lowered resistance to air flow imposed by the empty conveyor at the empty bin and air losses through the empty flour intake opening.

In accordance with the present invention the above problems are eliminated by an unloading apparatus that includes a plurality of pneumatic conveyors combined with a novel arrangement of conduits, ducts, and valve means which permit the selective delivery of conveying air to either or all of the pneumatic conveyors in the plurality. With this arrangement flour can be unloaded from any or all of a plurality of bin outlets without passing flows of flour and air from one conveyor through another conveyor. It should be pointed out that passing the same flour through pneumatic conveyors creates friction loss, pressure drop and lowered air flow rates thereby decreasing the ability of the air stream to convey advantageous amounts of flour.

As another aspect of the present invention the unloading of either a two compartment bin or one bin having two discharge openings may be optionally emptied by the unloader or the unloader may be connected to two separate bins and unloading effected from either one or two bins at the same time.

As another aspect of the present invention two separate bins may be filled with two types of flour such as hard wheat flour and soft wheat flour and the unloader can be used to uniformly effect a blend of two flours.

As another aspect of the present invention two flour conveyors are separately fed with flour and separately fed with air so that when operated in unison and delivering two flows of flour and air to a common conveying tube the pulsations present at one conveyor are wholly absent at the other conveyor.

As another aspect of the present invention the unloader includes two pneumatic conveyors that are so arranged that when only one conveyor is being operated the loss of air from the other conveyor to the storage bins is completely prevented.

As another aspect of the present invention the unloading apparatus includes a novel frame construction that utilizes longitudinally extending structural members as air ducts for selectively or concurrently delivering a flow or flows of air to one or more of the plurality of pneumatic conveyors.

It is another object of the present invention to provide an unloading apparatus of the type described that includes collapsible connectors, of novel construction, for attaching the apparatus of the present invention to the outlet of a storage bin or railroad car.

It is still another aspect of the present invention to provide an unloading apparatus of novel construction that provides a minimum overall height to permit movement of the apparatus under a railroad car having a relatively small amount of rail to car clearance and permit lower clearances under permanently positioned storage bins.

Further objects and advantages of the present invention will be apparent from the following description, reference being had to the accompanying drawings wherein a preferred form of embodiment of the invention is clearly shown.

Figure 1:
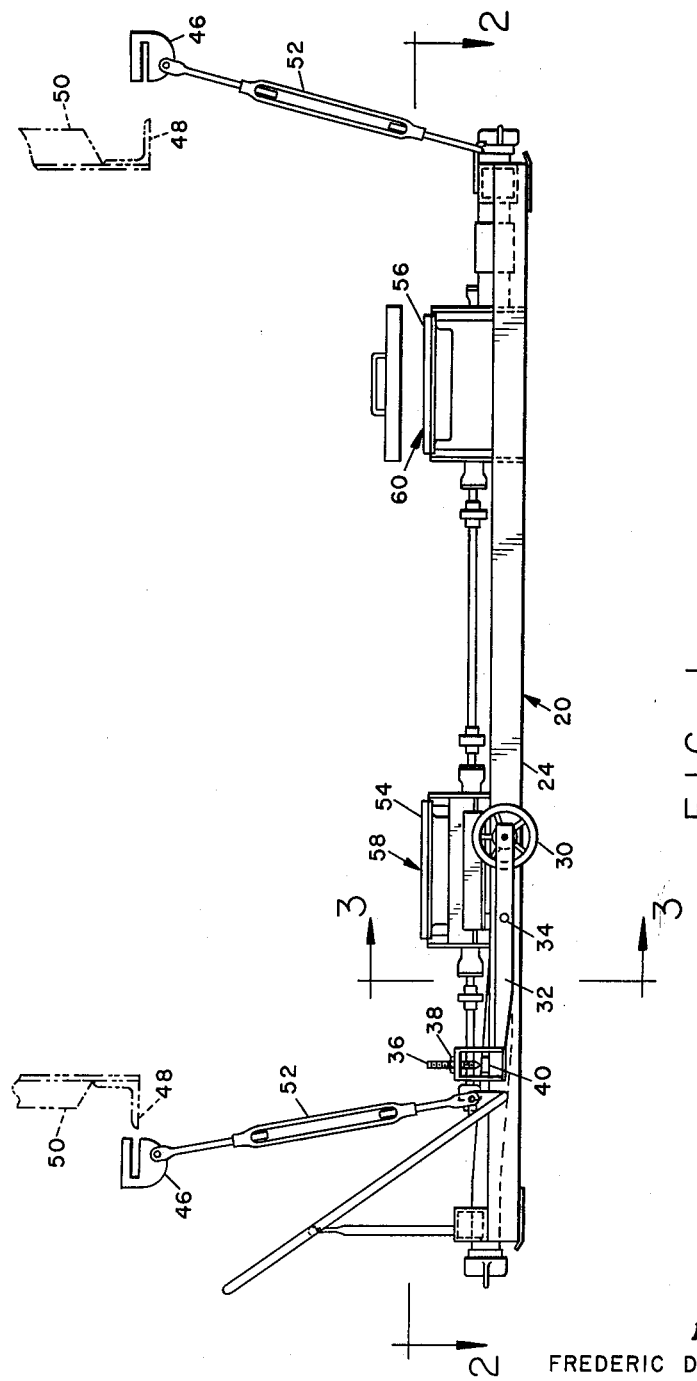
FIG. 1 is a side elevational view of a particle unloading apparatus constructed in accordance with the present invention.

Referring in detail to the drawings, the unloading apparatus comprises a frame means indicated generally at 20 that includes spaced longitudinally extending frame members 22 and 24 connected at their ends at lateral frame members 26 and 28.

The frame is supported by wheels 30 mounted on arm 32 pivotally attached to the frame at 34.

The frame means 20 can be elevated relative to wheels 30 by actuating threaded elements 36 which pass through female threaded elements 38 and engage a shoulder 40.

Wheels 30 are grooved at 42 to permit the apparatus to ride on a track 44.

After the frame means 20 has been positioned under a storage bin or loading car the brackets 46 are attached to flanges 48 on the bin or car frame 50 and turnbuckles 52 are actuated to move the top surfaces 54 and 56 of pneumatic conveyors 58 and 60 into sealed engagement with outlets in the bottom of respective flour bins or cars, not illustrated.

Figure 3:
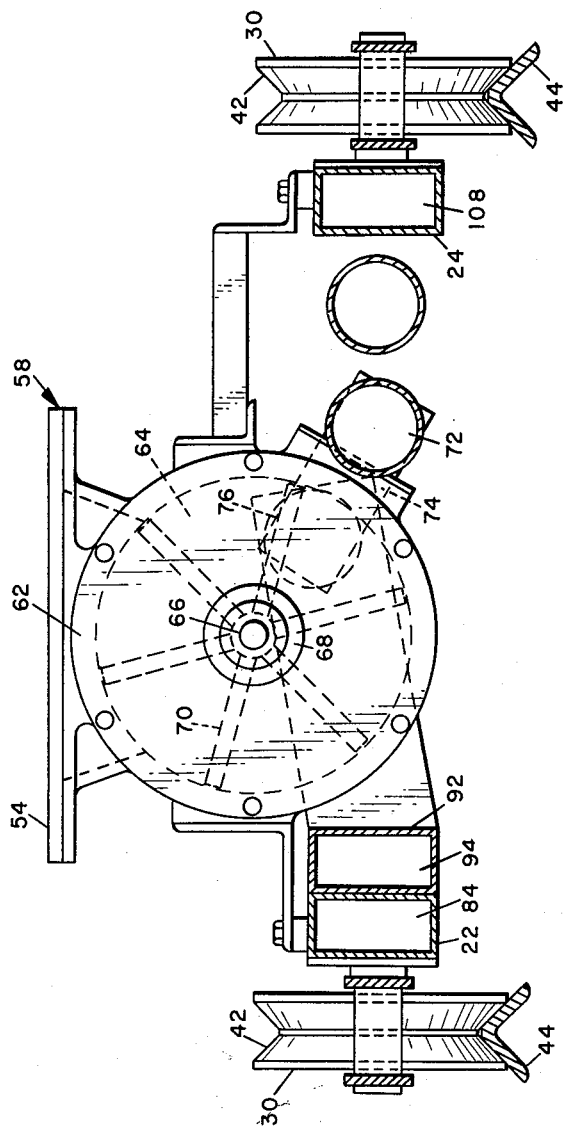
FIG. 3 is an end sectional view of the apparatus of the preceding figure, the section being taken along the line 3—3 of FIG. 1.

Reference is next made to FIG. 3 which illustrates one of the pneumatic conveyors 58 that includes top surface 54 surrounding a flour intake opening 62 that communicates with a cylindrical chamber 64. A shaft 66 extends longitudinally through the chamber and includes a hub 68 provided with a plurality of radially extending vanes 70. Pneumatic conveyor 58 includes a flour and air discharge opening 72 that communicates with an elongated side opening 74 formed through the casing of the conveyor.

Figure 2:
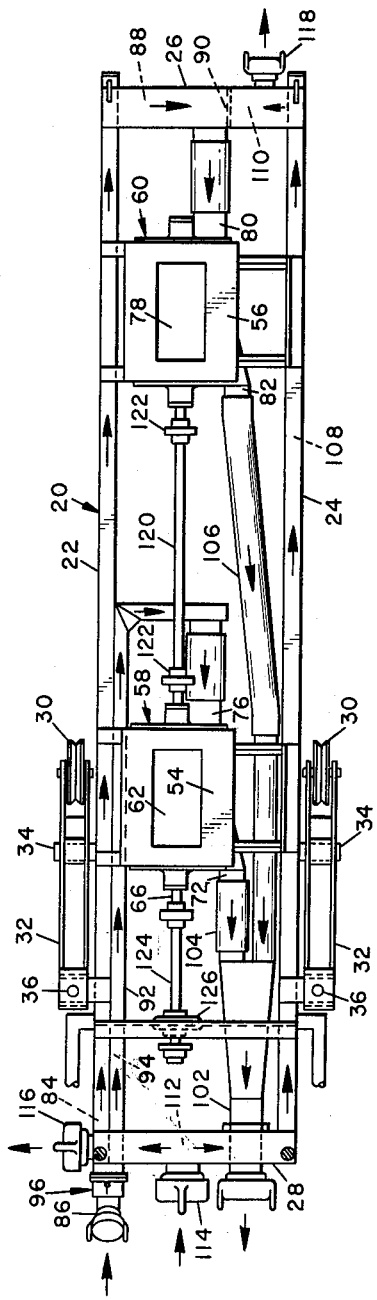
FIG. 2 is a plan view of the apparatus of FIG. 1.

Pneumatic conveyor 58 further includes an air intake opening 76 that enters an end of the housing. With reference to FIG. 2 it will be noted that air intake opening 76 and flour and air discharge opening 72 are mounted on the side of the casing of the pneumatic conveyor, rather than on the bottom, in order to decrease the overall height of the unloader since the maximum clearance, beneath a railroad car under load, is approximately 12 inches to the track rail.

The second pneumatic conveyor 60 is identical in construction to conveyor 58, previously described and illustrated in FIG. 3, and includes a flour intake opening 78, an air intake opening 80, and a flour and air discharge opening 82.

With reference to FIGS. 2 and 3 longitudinal frame member 22 forms a first air conduit 84 that connects a main air supply duct 86 with air intake opening 80 of conveyor 60 via conduit 84 and an adjoining conduit 88 formed by hollow transverse frame member 26. A wall 90 blocks the passage of air from conduit 88 to hollow frame member 24. A second longitudinally extending frame member 92 forms a second air conduit 94, FIG. 3, that connects air supply duct 86 with intake 76 of pneumatic conveyor 58.

Figure 4:
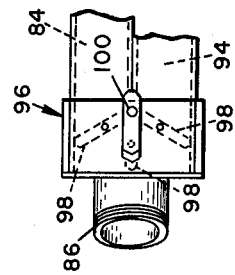
FIG. 4 is a top view of a valve means comprising a portion of the apparatus of the preceding figures.

With reference to FIGS. 2 and 4 a valve means indicated generally at 96 serves to selectively connect main air supply duct 86 with either or both of the previously mentioned air conduits 84 and 94. The valve includes a vane indicated in its center position at 98 which vane is shiftable about a pivot 100. When the vane is in the left position, illustrated in dotted delineation in FIG. 4, air is delivered only to air conduit 94. When vane 98 is in the right position, illustrated in dotted delineation in FIG. 4, air is delivered only to air conduit 84.

The apparatus of FIG. 2 further includes main flour and air discharge duct 102 that receives a flow of flour and air from conveyor 58 via a conduit 104. The flow of flour and air from conveyor 60 is delivered to discharge duct 102 via a conduit 106.

With reference to FIGS. 2 and 3, right frame 24 forms a longitudinally extending air duct 108 which communicates with a transverse duct 110 in lateral frame member 26 and with a transverse duct 112 in transverse frame member 28. The purpose of this duct system including ducts 108, 110, and 112, is to receive pressurized air at an intake 114 and to divide the flow and deliver it to either or both separate compartments to air-activate the flour and causes it to become readily flowable so that it is delivered fluidized to the pneumatic conveyors. Connections for conduits leading to the compartments are seen at 116 and 118 in FIG. 2. The reason for delivering pressurized air to the separate compartments is to fluidize the flour and cause it to move downwardly along inclined bottom walls of the compartments and into the inlets 62 and 78 of the pneumatic conveyors 58 and 60.

With reference to FIGS. 1 and 2, shafts for pneumatic conveyors are connected by drive rod 120 to flexible couplings 122, the latter serving to compensate for misalignment of the conveyor shafts. Shaft 66 of conveyor 58 is connected to a motor, not illustrated, by means of a shaft 124 mounted to a frame at a bearing 126.

In operation the apparatus of the present invention, positioned on the rails 44 or on other surfaces, are rolled under a storage bin or railroad car with the openings 62 and 78 of the pneumatic conveyors being positioned beneath the outlets of the compartments to be unloaded. Brackets 46 are attached to shoulders 48 on the frame of the bin or car and turnbuckles 52 are actuated to effect a tight seal between the surfaces 54 and 56, FIG. 2, and confront surfaces at the outlets of the compartments.

An optional means of operation consists of positioning the unloader on the car rail with conveyors 54 and 78 under the car or bin outlets. The conveyor inlets 54 and 56 are next connected to the car or bin outlets with flexible tubing which has as its objective the avoidance of difficulty in balancing the adjustment between hanger rods 52 and the car or bin.

The compartments to be emptied are next connected to flour fluidizing air outlets 116 and 118, FIG. 2, and the inlet 114 for the fluidizing air is connected to a blower, not illustrated.

Valve 96 is next positioned in one of the three positions illustrated in FIG. 4, depending on whether one or the other, or both, of the pneumatic conveyors are to be actuated to unload their respective compartments. If vane 98 is centered air is delivered through both of the ducts 84 and 94 upon energization of a blower, not illustrated, connected to main air duct 86.

The motor that drives pneumatic conveyors 58 and 60 is also energized whereby vane 70 successively presents charges of flour to the flowing streams of air. The air and entrained flour leave the pneumatic conveyors through ducts 104 and 106, both of which connect with main outlet duct 102.

If only pneumatic conveyor 58 is to be actuated to empty its respective bin, van 98 of valve 96 is positioned in the upper position as viewed in FIG. 4, whereby air is delivered to conveyor 58 via conduit 94. If, on the other hand, only pneumatic conveyor 60 is to be actuated vane 98 of valve 96 is moved to the lower position, as viewed in FIG. 4, whereby air is delivered only to conveyor 60 via conduits 84 and 88.

Figure 5:
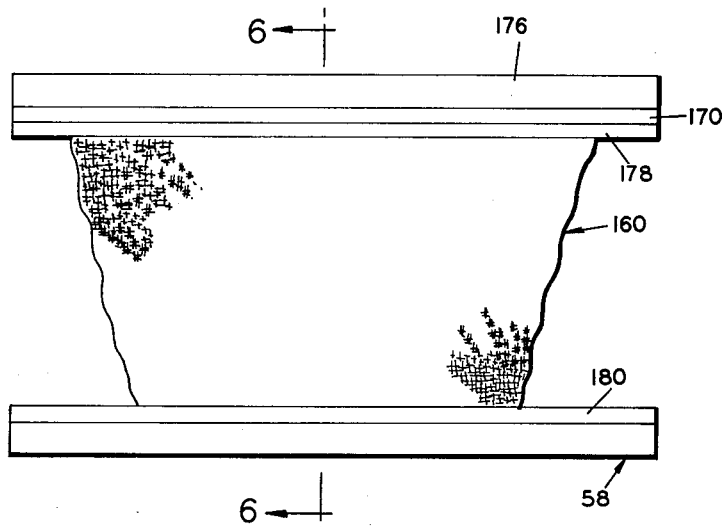
FIG. 5 is a side elevational view of a collapsible connector for placing the apparatus of the present invention in communication with the interior of a storage bin or railroad car.
Figure 6:
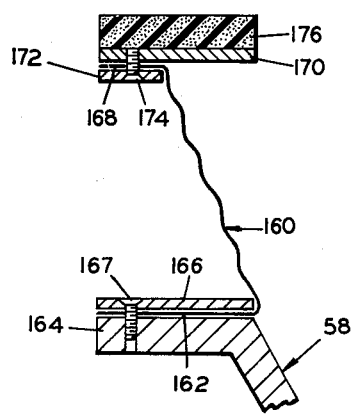
FIG. 6 is a sectional view of the connector of FIG. 5, the section being taken along the line 6—6 of FIG. 5.
Figure 7:
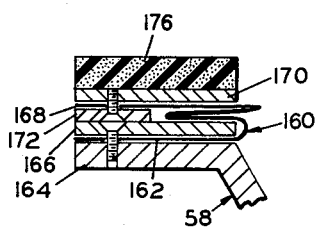
FIG. 7 is a partial sectional view of the collapsible connector of FIGS. 5 and 6.

Reference is next made to FIGS. 5 through 7 which illustrate a collapsible connector for connecting the intake of a pneumatic conveyor 58, FIG. 1, to the outlet of a storage bin or railroad car.

The apparatus includes a cloth connector indicated generally at 160 which is formed of nylon or the like. The connector includes a lower inturned flap 162 that is clamped between a top flange 164 on conveyor 58 and a lower clamping plate 166 by a plurality of screws 167.

The top of cloth connector 160 includes an inturned flap 168 that is clamped between upper plates 170 and 172 by a plurality of screws 174.

The top surface of plate 130 carries a gasket 176 formed of suitable resilient gasket material.

With reference to FIG. 5 upper and lower backing flanges 178 and 180 may be mounted to plate 170 and flange 148 in surrounding relationship with the top and bottom junctions of cloth connector 160.

In operation, the apparatus of FIGS. 1 through 4 is moved under a railroad car with collapsible connectors mounted on the top flanges of conveyors 58 and 60 and with the cloth connector 160 in the collapsed configuration of FIG. 7. The top plate 170 and resilient gasket 176 are lifted, as required, and attached to the outlet openings of the railroad car.

When the apparatus is operated to unload the car, the weight imposed on the car springs will progressively decrease and the car will raise relative to the unloaded apparatus as the bins are emptied. Due to the flexible connector 160 upper plate 170 and gasket 176 can move upwardly with the car body and an airtight and sanitary connection will at all times be maintained.

While the form of embodiment of the present invention as herein disclosed constitutes a preferred form it is to be understood that other forms might be adopted, all coming within the scope of the claims which follow.

I claim:
1. An apparatus for unloading finely divided particles from a plurality of bin outlets comprising, in combination, frame means; a first pneumatic conveyor carried by said frame means and including a particle intake opening, an air intake opening, and a discharge opening for a flow of particles and air; a second pneumatic conveyor carried by said frame means and including a particle intake opening, an air intake opening, and a discharge opening; a first air conduit including a first end and a second end communicating with said air inlet of said first conveyor; a second air conduit including a first end and a second end communicating with said air inlet of said second conveyor; a main air supply conduit communicating with said first ends of said air conduits; valve means including a centered position wherein air from said main air supply conduit is delivered to both of said first and second air conduits, a second position wherein air is delivered to only one of said first and second air con- duits, and a third position wherein air is delivered to only the other of said first and second air conduits; a main particle and air discharge duct; a first particle and air discharge conduit connecting the outlet of said first conveyor with said duct; and a second particle and air discharge conduit connecting the outlet of said second conveyor with said main duct.

2. An apparatus for unloading finely divided particles from a plurality of bin outlets comprising, in combination, frame means including first and second hollow frame members forming a first air conduit having an air inlet and an air outlet and a second air conduit having an air inlet and an air outlet; a first pneumatic conveyor including a particle intake opening, a particle and air discharge opening and an air intake opening, said air intake opening being connected to said air outlet of said first air conduit; a second pneumatic conveyor including a particle intake opening, a particle and air discharge opening and an air intake opening, said air intake opening being connected to said air outlet of said second air conduit; a main air duct communicating with said air inlets of said air conduits; a main particle and air discharge duct on said frame means and including an outlet for discharge of particles from said apparatus to a destination; a first particle and air discharge conduit means connecting the outlet of said first conveyor with said main duct; and a second particle and air discharge conduit means connecting the outlet of said second conveyor with said main duct, said two discharge conduit means serving to converge two simultaneously flowing streams of particles and air from said two pneumatic conveyors.

3. An apparatus for unloading finely divided particles from a plurality of bin outlets comprising, in combination, frame means including first and second hollow frame members forming a first air conduit having an air inlet and an air outlet and a second air conduit having an air inlet and an air outlet; a first pneumatic conveyor including a particle intake opening, a particle and air discharge opening, and an air intake opening, said air intake opening being connected to the said air outlet of said first air conduit; a second pneumatic conveyor including a particle intake opening, a particle and air discharge opening, and an air intake opening, said air intake opening being connected to said air outlet of said second air conduit; a main air duct communicating with said air inlets of said air conduits; a main particle and air discharge duct on said frame means and including an outlet for discharge of particles from said apparatus to a destination; a first particle and air discharge conduit means connecting the outlet of said first conveyor with said main duct; a second particle and air discharge conduit means connecting the outlet of said second conveyor with said main duct, said two discharge conduit means serving to converge two simultaneously flowing streams of particles and air from said two pneumatic conveyors; and a third hollow frame member forming a third air conduit means, said third conduit means including an inlet for connection with a source of pressurized air, a first outlet for connection with a bin from which particles are being conveyed, and a second outlet for connection with a second bin from which particles are being conveyed, said third conduit means serving to fluidize said particles from the bins being unloaded.

4. An apparatus for unloading finely divided particles from a storage bin outlet comprising, in combination, frame means; including hollow frame members forming air delivery conduit means, a first pneumatic conveyor including a top portion forming a top intake opening, a particle and air discharge opening, and an air intake opening communicating with said air delivery conduit means; a second pneumatic conveyor including a top portion forming a top intake opening, a particle and air discharge opening, and an air intake opening communicating with said air delivery conduit means; a connector of flexible material including a lower flap portion attached to said top portion of said first conveyor, said connector including an upper flap portion; an upper connector plate attached to said upper flap portion and vertically movable relative to said conveyor whereby said connector can be moved between a collapsed position and an extended position, a main particle and air discharge duct on said frame means and including an outlet for discharge of particles from said apparatus to a destination; a first particle and air discharge conduit means connecting the outlet of said first conveyor with said main duct; and a second particle and air discharge conduit means connecting the outlet of said second conveyor with said main duct, said two discharge conduit means serving to converge two simultaneously flowing streams of particles and air from said two pneumatic conveyors; a second connector of flexible material including a lower flap portion attached to said top portion of said second conveyor, said second connector including an upper flap portion; an upper connector plate attached to said second upper flap portion and vertically movable relative to said second conveyor whereby said second connector can be moved between a collapsed position and an extended position.

References Cited in the file of this patent

UNITED STATES PATENTS

| | | |
|---|---|---|
| 1,473,757 | Dorsey | Nov. 13, 1923 |
| 2,030,553 | Tiley | Feb. 11, 1936 |
| 2,378,553 | Hornbrook | June 19, 1945 |
| 2,647,802 | Hornbrook | Aug. 4, 1953 |
| 2,813,640 | Loomis | Nov. 19, 1957 |